United States Patent
Kim et al.

(10) Patent No.: US 10,769,492 B2
(45) Date of Patent: Sep. 8, 2020

(54) UNSUPERVISED VISUAL ATTRIBUTE TRANSFER THROUGH RECONFIGURABLE IMAGE TRANSLATION

(71) Applicant: SK TELECOM CO., LTD., Seoul (KR)

(72) Inventors: Taeksoo Kim, Seoul (KR); Byoungjip Kim, Seoul (KR); Jiwon Kim, Seoul (KR); Moonsu Cha, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 133 days.

(21) Appl. No.: 16/050,072

(22) Filed: Jul. 31, 2018

(65) Prior Publication Data

US 2019/0042882 A1    Feb. 7, 2019

(30) Foreign Application Priority Data

Aug. 4, 2017 (KR) .......................... 10-2017-0099141

(51) Int. Cl.
*G06K 9/62* (2006.01)
*G06N 3/04* (2006.01)
(Continued)

(52) U.S. Cl.
CPC ......... *G06K 9/6234* (2013.01); *G06N 3/0454* (2013.01); *G06N 3/088* (2013.01); *G06T 5/50* (2013.01)

(58) Field of Classification Search
CPC ........ G06N 3/0454; G06N 3/08; G06N 20/00; G06N 20/10; G06N 20/20; G06N 3/04;
(Continued)

(56) References Cited

U.S. PATENT DOCUMENTS 10,019,631 B2 * 7/2018 Tao ...................... G06N 3/0454
2009/0034622 A1 * 2/2009 Huchet ................. H04N 19/154
375/240.16

(Continued)

OTHER PUBLICATIONS

Kim et al., "Unsupervised Visual Attribute Transfer with Reconfigurable Generative Adversarial Networks," published on Jul. 31, 2017, 11 pages.

*Primary Examiner* — Golam Sorowar
(74) *Attorney, Agent, or Firm* — Hauptman Ham, LLP (57) ABSTRACT

The present disclosure relates to unsupervised visual attribute transfer through reconfigurable image translation. One aspect of the present disclosure provides a system for learning the transfer of visual attributes, including an encoder, converter and generator. The encoder encodes an original source image to generate a plurality of attribute values that specify the original source image, and to encode an original reference image to generate a plurality of attribute values that specify the original reference image. The converter replaces at least one attribute value of an attribute that is target attribute of the attribute values of the original source image with at least one corresponding attribute value of the original reference image, to obtain a plurality of attribute values that specify a target image of interest. The generator generates a target image based on the attribute values of the target image of interest.

3 Claims, 6 Drawing Sheets
(3 of 6 Drawing Sheet(s) Filed in Color)

(51) Int. Cl.
*G06T 5/50* (2006.01)
*G06N 3/08* (2006.01)

(58) Field of Classification Search
CPC ...... G06N 3/0445; G06N 3/084; G06N 7/005; G06K 9/4628; G06K 9/6256; G06K 2009/3291; G06K 9/00221; G06K 9/00288; G06K 9/00664; G06K 9/00758; G06K 9/00765; G06K 9/3241; G06K 9/34; G06K 9/4604; G06K 9/4652; G06K 9/6202; G06K 9/6215; G06K 9/6232; G06K 9/6234; G06K 9/6259; G06K 9/6269; G06K 9/627; G06T 2207/20084; G06T 11/00; G06T 11/001; G06T 2207/20081; G06T 2207/20221; G06T 11/60; G06T 15/205; G06T 2207/10016
See application file for complete search history.

(56) References Cited

U.S. PATENT DOCUMENTS

| | | | | |
|---|---|---|---|---|
| 2015/0347819 | A1* | 12/2015 | Yin | G06K 9/00221 |
| | | | | 382/118 |
| 2017/0200065 | A1* | 7/2017 | Wang | G06K 9/4628 |
| 2017/0294000 | A1* | 10/2017 | Shen | G06T 11/001 |
| 2018/0234671 | A1* | 8/2018 | Yang | G06K 9/6232 |
| 2018/0260665 | A1* | 9/2018 | Zhang | G06K 9/6215 |
| 2018/0260668 | A1* | 9/2018 | Shen | G06N 3/0454 |
| 2018/0373999 | A1* | 12/2018 | Xu | G06N 3/0454 |
| 2020/0085290 | A1* | 3/2020 | Wang | G06T 7/0014 |

* cited by examiner

(a) Input  (b)  (c)  (d)

*FIG. 6*

UNSUPERVISED VISUAL ATTRIBUTE TRANSFER THROUGH RECONFIGURABLE IMAGE TRANSLATION

CROSS-REFERENCE TO RELATED APPLICATION

This application claims priority under 35 U.S.C § 111(a) of Patent Application No. 10-2017-0099141, filed on Aug. 4, 2017 in Korea, the entire content of which is incorporated herein by reference.

TECHNICAL FIELD

The present disclosure relates to training deep neural networks.

BACKGROUND

The statements in this section merely provide background information related to the present disclosure and do not necessarily constitute prior art.

Advances have been significant and concerns have increased in the field of image stylization, including image style transfer, texture transfer and color transfer. Most known researches tackle the visual attribute transfer problem in which the visual attributes of an image are changed to the visual attributes of another image.

Despite their remarkable results, most of these studies were limited to holistic attribute transfer. In other words, the suggested works could transfer texture, color or style that cover the whole image but not the subject's image details like smiles or hair colors.

SUMMARY

The present disclosure aims to provide an unsupervised visual attribute transfer mechanism using a reconfigurable image translation network. In particular, the present disclosure provides a visual attribute transfer mechanism capable of transferring certain feature details of an image instance-level, without paired dataset.

According to one aspect of the present disclosure, there is provided a system for learning the transfer of visual attributes, including an encoder, a converter, a generator and a discriminator. The encoder is configured to encode an original source image to generate a plurality of attribute values that specify the original source image, and to encode an original reference image to generate a plurality of attribute values that specify the original reference image. The converter is configured to replace at least one attribute value of an attribute (hereinafter referred to as "target attribute") of the attribute values of the original source image with at least one corresponding attribute value of the original reference image, to obtain a plurality of attribute values that specify a target image of interest. The generator is configured to generate a target image based on the attribute values of the target image of interest. The discriminator is configured to learn a discrimination model for discriminating the generated target image from the original source image.

During training the system, the encoder encodes the generated target image to generate a plurality of attribute values that specify the generated target image, the converter replaces at least one attribute value corresponding to the target attribute among the attribute values of the generated target image with at least one attribute value corresponding to the target attribute of the original source image, to generate a plurality of attribute values for a source image reconstruction, and the generator generates a reconstructed source image based on the attribute values for the source image reconstruction.

During training the system, the converter replaces at least one attribute value corresponding to the generated target attribute among the attribute values of the original reference image with at least one attribute value corresponding to the target attribute of the target image, to generate a plurality of attribute values for a reference image reconstruction, and the generator generates a reconstructed reference image based on the attribute values for the reference image reconstruction.

When receiving the training, the system updates parameters of the neural network by using a reconstruction loss that represents a difference between the reconstructed source image and the original source image, a reconstruction loss that represents a difference between the reconstructed reference image and the original reference image, and a generative adversarial loss of the generated target image.

According to another aspect of the disclosure, there is provided a computer-implemented method of training neural networks to learn a visual attribute transfer for causing the neural networks to perform the computer-implemented method including generating a target image by transferring a target attribute of an original reference image to an original source image, generating a reconstructed source image by transferring a target attribute of the original source image to the generated target image, generating a reconstructed reference image by transferring the target attribute of the generated target image to the original reference image, and updating parameters of the neural networks by using a reconstruction loss that represents a difference between the reconstructed source image and the original source image, a reconstruction loss that represents a difference between the reconstructed reference image and the original reference image, and a generative adversarial loss of the generated target image.

With the reconfigurable image transfer framework provided by some embodiments of the present disclosure, a single transfer model can be used in an easily reconfigurable manner for multiplex translations involving a variety of visual features.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Hereinafter, some embodiments of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity. In the present disclosure, attributes refer to superordinate or high-level features of a dataset which are independent from each other, and can be disentangled in well-defined feature space. Further, attribute values refer to a set of probable or possible values for each attribute that can be easily labeled. Domain refer to a set of data that have labeled with a certain attribute value.

The image translation network provided by the present disclosure learns to render images with encodings of visual attributes by using a generative adversarial networks (GANs) framework. The image translation network can change the encoded attribute value into the target value of interest and selectively translate the input image into another domain image. In addition, such translation network can be easily reconfigured by changing the target visual attribute and the target value thereof, to translate the input image into other output domains. In other words, after training the translation network, by changing the encoded attribute value of the given image to another value and passing the changed attribute value through a generator network via a new hybrid encoding operation, the visual attribute of the given image can be transferred to other images.

In the following, the learning algorithm provided by the present disclosure will be firstly described to present its motivation, and then the provided algorithm method. In particular, the present disclosure explains a learning algorithm of a single-attribute image translator that is reconfigurable, and finally exhibits that the provided algorithm can be expanded to "multiple translations" in which multiple translations are performed simultaneously.

An image can be rendered with various attributes, each attribute having one of multiple values. For example, a human image can be rendered with attributes such as gender, hair color and facial expression, and these attributes can have values such as male, brown and smile, respectively. Then, the image translation processing can be seen as changing the values of one or more attributes.

Figure 1:
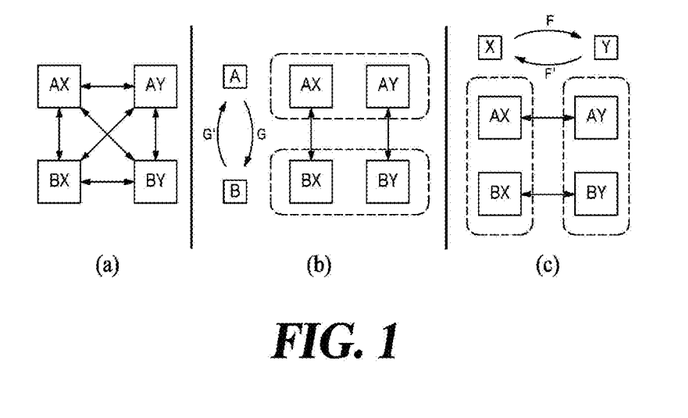
FIG. 1 is a schematic diagram showing the transfers between images represented by two attributes each having one of two values.

FIG. 1 shows at (a) all possible translations between images rendered using two attributes each having one of two values. The first attribute value may be A or B, and the second attribute value may be X or Y. In the simplest approach, translation of the image between four image domains need six separately trained translators (twelve translations when the translation is not bidirectional).

In a more preferred approach, to reduce the number of required translators, a dedicated attribute-specific translator (e.g., mapping G; G' and F; F' in FIG. 1 at (b) and (c)) may be learned. In this case, sequential application of single-attribute translators are sufficient to perform translations between all four image domains.

The approach according to the present disclosure provides further simplified procedure by embedding multiple single-attribute translators into a single reconfigurable translator network. By switching between target attribute values of interest as needed, a single translator network may be used for performing image translations between multiple source-target domain pairs.

In the present disclosure, image domain is defined as a set of all images sharing one or more attribute values, and image translation is defined as mapping between two image domains. In the simplest case, image translator T may be regarded as a transfer function that changes an attribute of the input image to a specific value. Typical image translator T performs image translations only between the two domains, and therefore such image translators T need to be learned one by one for each of the multiple source-target domain pairs. On the contrary, the image translator provided by the present disclosure is flexible in that it can singly change target attributes requiring no additional training, and thereby selects the target domain of interest.

Figure 2:
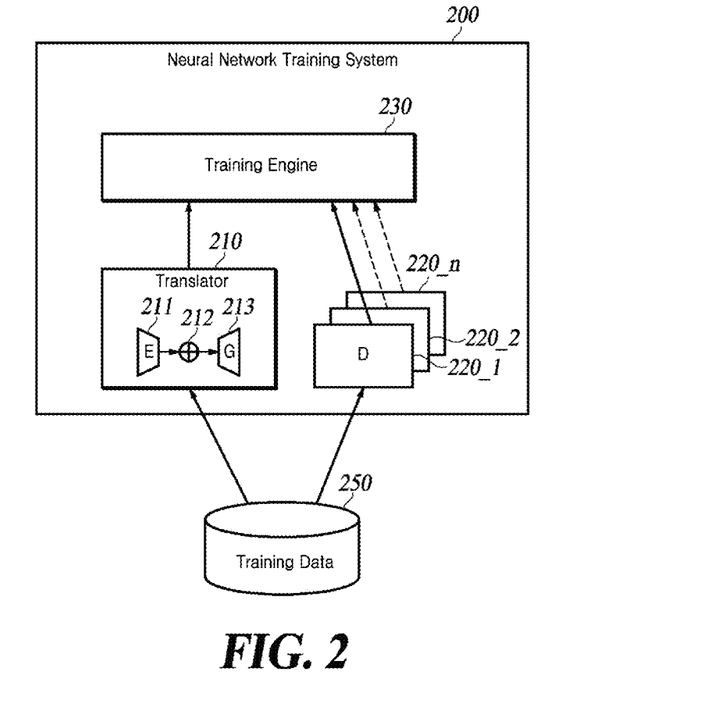
FIG. 2 is a schematic diagram of an exemplary neural network training system of some embodiments of the present disclosure.

FIG. 2 is a schematic diagram showing an exemplary neural network training system of the present disclosure.

A neural network training system 200 is an example system implemented as a computer program on one or more computers, which implements the following method.

In the neural network training system, a training engine 230 operates, based on the training data in a training data storage 250, for training neural networks to learn the visual attribute transfer described below. Specifics of the provided training algorithm will be described later with reference to FIG. 3.

The training data in the training data storage 250 contains training sets. The training sets include source images and reference images. Each set of reference images can be seen as a set of all images sharing the attribute value of one or more attributes.

The neural network training system has a translator 210 which may be configured to transfer one or multiple target attributes of the reference image to a source image. The translator 210 may include an encoder 211, a converter 212, and a generator 213. The encoder 211 may be a deep neural network composed of convolution layers. The generator 213 can be seen as a deep neural network composed of deconvolution layers, i.e., a decoder.

The encoder 211 may encode the input image and generate a plurality of attribute values specifying the input image. For example, the encoder 211 encodes a source image (i.e., original source image) input from the training data storage 250 to generate a plurality of attribute values specifying the original source image, and it encodes a reference image (i.e., original reference image) input from the training data storage 250 to generate a plurality of attribute values for specifying the original reference image.

The converter 212 replaces the attribute value of at least one target attribute among the attributes of the original source image with its corresponding attribute value of the original reference image, to thereby generate a plurality of attribute values specifying the target image of interest. The replacement target attribute by the converter 212 coupled with its attribute value changing can easily reconfigure the translator 210 to translate the input image into other output domains.

The generator 213 generates an image based on the attribute value of the attribute output from the converter. For example, the generator 213 can generate a target image based on attribute values of a target image of interest output from the converter.

The neural network training system 200 may further include a plurality of discriminators 220_1 to 220_n. The neural network training system 200 may provide discriminators each being distinctive to each attribute value. Each of the discriminators 220_1 to 220_n may be a deep neural network including a sigmoid that outputs a scalar output between convolution layers and [0, 1]. Each of the discriminators 220_1 to 220_n discriminates and scores between the target image generated by the generator 213 and the source image. It can be seen that the discriminators 220_1 to 220_n each forms generative adversarial networks (GANs) in relation to the generator 213.

In the training process, the encoder 211 may generate a plurality of attribute values specifying the target image generated by encoding the generated target image. The converter 212 may replace at least one attribute value corresponding to the target attribute among the attribute values of the generated target image with at least one attribute value corresponding to the target attribute of the original source image, to generate a plurality of attribute values for a source image reconstruction. In addition, the converter 212 may replace at least one attribute value corresponding to the target attribute among the attribute values of the original reference image with at least one attribute value corresponding to the target attribute of the target image, to generate a plurality of attribute values for a reference image reconstruction. The generator 213 may generate a reconstructed source image based on the attribute values for the source image reconstruction provided from the converter 212, and it may generate a reconstructed reference image based on the attribute values for the reference image reconstruction provided from the converter 212.

In order to update parameters of the neural networks 211, 213, 220, losses may be used, which include a reconstruction loss that represents a difference between the reconstructed source image and the original source image, a reconstruction loss that represents a difference between the reconstructed reference image and the original reference image, and a generative adversarial loss of the generated target image. The reconstruction loss of the source image indicates how well the reconstructed source image is reconstructed. The reconstruction loss of the reference image indicates how well the reconstructed reference image has become. The generative adversarial loss indicates how realistic the generated target image is.

Figure 3:
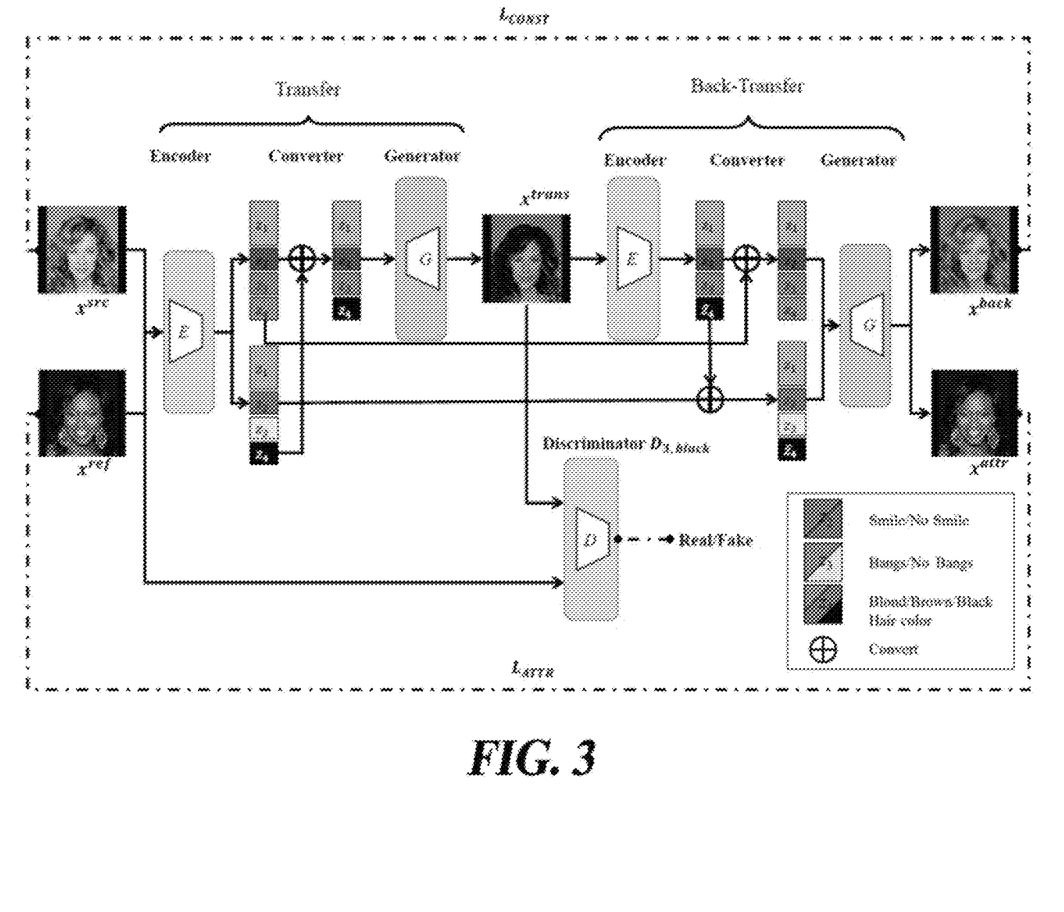
FIG. 3 is a schematic diagram of a neural network architecture and a training process provided by some embodiments of the present disclosure.

FIG. 3 is a schematic diagram of a neural network architecture and a training process provided by some embodiments of the present disclosure. FIG. 3 illustrates translating the color attribute of hair into "black hair." The provided model includes an encoder E, a generator G, and a discriminator $D_d$ for an attribute value d. Encoder E has an image x as an input and encodes it into attribute features z (that is, $z=E(x)$). Attributes can be assumably disentangled in a well-defined feature space. Therefore, z can be expressed as a tuple of multiple slots. In other words, $z=\{z_1, z_2, \ldots, z_n\}$, where n is the number of attributes of interest. Generator G generates an image from the encoded attribute features. In other words, $y=G(z_1, z_2, \ldots z_n)$, where y indicates the generated image.

In order to transfer target attribute from the original reference image to the original source image, both original source image $x^{src} \sim p_{data}(x)$ and original reference image $x^{ref} \sim p_d(x)$ are first encoded: $z^{src}=E(x^{src})$ and $z^{ref}=E(x^{ref})$, where $p_{data}(x)$ is the data distribution of the entire dataset, and $p_d(x)$ denotes the distribution of the domain of attribute value d. For the sake of simplicity, the notation for the attribute index has been omitted. After the target slot of $z^{src}$ is replaced by that of $z^{ref}$, generator G takes its attribute features to generate the target image $x^{trans}$. In other words, $x^{trans}=G(z_1^{src}, z_2^{src}, \ldots, z_{tar}^{ref}, \ldots, z_n^{src})$.

In order for the generated target image to have the target attribute from the original reference image, some embodiments impose three constraints. i) First of all, the generated target image needs to belong to the same target attribute domain as that of the original reference image. ii) In addition, the generated target image needs to keep other attributes intact after the transference of attribute. iii) Finally, the generated target image is required to have the exact details of the original reference image's target attribute. To encourage these three constraints to be satisfied, some embodiments impose objective for each constraint. The following explains each of objectives in more detail.

(1) Transfer

Transferring target attribute so that the generated image belongs to the corresponding attribute domain can be implemented by using a GAN framework. Here, this objective is denoted as transfer objective. As illustrated in FIG. 3, assuming the target attribute corresponds to hair color, and the original reference image has black hair as the attribute value thereof, at least one embodiment enforces the generated target image $x^{trans}$ to be indistinguishable from images in black hair domain. This transfer objective may be expressed as follows.

$$L_{trans,d} = \mathbb{E}_{x \sim Pdata(x)}[\log(1-D_d(x^{trans}))] \qquad \text{Equation 1}$$

In addition, the discriminator objective of GAN may be expressed as follows.

$$L_{dis,d} = \mathbb{E}_{x \sim Pdata(x)}[\log(1-D_d(x^{trans}))] + \mathbb{E}_{x^{ref} \sim Pd(x)}[\log D_d(x^{ref})] \qquad \text{Equation 2}$$

(2) Back-Transfer

To ensure that all of the remaining non-target attributes are kept intact, at least one embodiment introduces back-transfer objective. The generated target image $x^{trans}$ is again encoded as $z^{trans}=E(x^{trans})$, then the original target slot of $z^{src}$ is replaced by the target slot of $z^{trans}$ as $z^{back}=\{z_1^{trans}, z_2^{trans}, \ldots, z_{tar}^{src}, \ldots, z_n^{trans}\}$. At least one embodiment forces the generated image from this feature $z^{back}$ to be the same as the original source image $x^{src}$: $x^{back}=G(z^{back}) \approx x^{src}$. These objectives may be mathematically expressed as follows, with all non-target attributes of the target image being forced to be the same as the attributes of the original source image. In Equation 3, calculation of the distance function d( ) may use distance metrics including L1, L2 or Huber.

$$L_{back,d} = \mathbb{E}_{x^{src} \sim pdata(x)}[d(x^{src}, x^{back})] \qquad \text{Equation 3}$$

(3) Attribute Consistency

Training a model with the transfer objective and the back-transfer objective ensures the generated target image to have the target attribute value, while the remaining non-target attributes are kept intact. However, these objectives do not ensure the generated target image to have the exact attribute details of the original reference image. For example, the generated target image can have any type of bang hair, as long as it is indistinguishable from the images in bang hair domain. At least one embodiment, therefore, introduces attribute-consistency objective that ensures the transference of the details. To this end, once the original target slot of $z^{src}$ is replaced by the target slot of $z^{trans}$, the generator G uses the attribute features, to generate a reconstructed reference image $x^{attr}$. At least one embodiment forces the reconstructed reference image $x^{attr}$ to be the same as the original reference image $x^{ref}$: $x^{attr}=G(z_1^{ref}, z_2^{ref}, \ldots, z_{tar}^{trans}, \ldots, z_n^{ref}) \approx x^{ref}$ These objectives may be mathematically expressed as follows. In Equation 4, calculation of the distance dist( ) may use distance metrics including L1, L2 or Huber.

$$L_{attr,d} = \mathbb{E}_{x^{ref} \sim Pd(x)}[\text{dist}(x^{attr}, x^{ref})] \qquad \text{Equation 4}$$

(4) Full Objective

The full transfer objective $L_d$ for attribute value d is expressed by Equation 5, where $\lambda_1$, $\lambda_2$, and $\lambda_3$ are importance weights of respective objectives.

$$L_d = \lambda_1 L_{trans,d} + \lambda_2 L_{back,d} + \lambda_3 L_{attr,d} \qquad \text{Equation 5}$$

During training, for all attribute values d, the parameters of encoder E and generator G are updated by using $L_d$ of Equation 5, and the parameters of discriminator $D_d$ are updated by using $L_{dis,d}$ of Equation 2.

Figure 4:
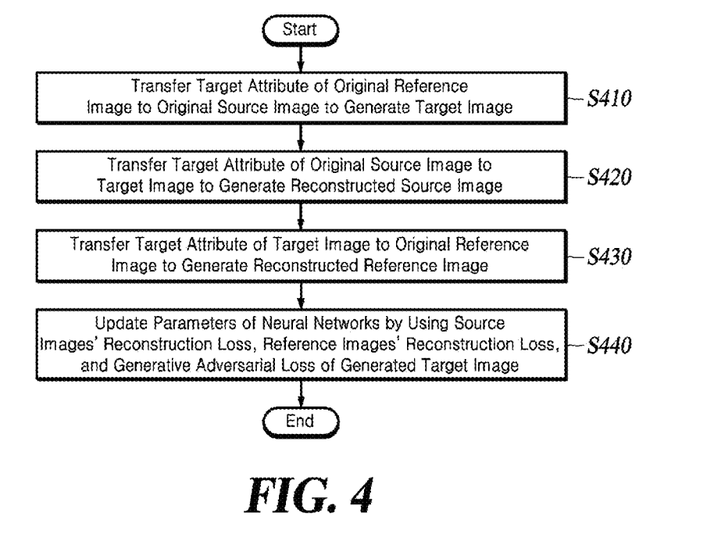
FIG. 4 is a flowchart illustrating a method of training a neural network to learn to transfer visual attributes according to aspects of the present disclosure.

FIG. 4 is a flowchart illustrating a method of training an artificial neural network to learn to transfer visual attributes according to an aspect of the present disclosure. The above method may be implemented, for example, as a computer program on a computer, and allows the artificial neural networks (for example, the encoder, converter, generator, discriminator, etc. illustrated in FIGS. 2 and 3) to perform the respective steps illustrated in FIG. 4.

First, the neural networks transfer the target attribute of the original reference image to the original source image to generate a target image (S410). An encoder, converter and generator perform the following steps to generate the target image. The encoder encodes an original source image $x^{src}$ to generate a plurality of attribute values that specify the original source image, and encodes an original reference image $x^{ref}$ to generate a plurality of attribute values that specify the original reference image. In order to generate a plurality of attribute values that specify a target image of interest, the converter replaces at least one attribute value of a target attribute from among the attribute values of the original source image $x^{src}$ with at least one corresponding attribute value of the original reference image $x^{ref}$. The generator generates a target image $x^{trans}$ based on the attribute values of the target image of interest, which are provided from the converter.

Next, the neural networks transfer the target attribute of the original source image to the target image to generate a reconstructed source image (S420). An encoder, converter and generator perform the following steps to generate the reconstructed source image. The encoder encodes the generated target image $x^{tran}$ to generate a plurality of attribute values that specify a generated target image. In order to generate a plurality of attribute values for a source image reconstruction, the converter replaces at least one attribute value corresponding to the target attribute from among attribute values of the generated target image, which are provided from the encoder with at least one attribute value corresponding to the target attribute of the original source image. The generator generates a reconstructed source image $x^{back}$ based on the attribute values for the source image reconstruction, which are provided from the converter.

Then, the neural networks transfer the target attribute of the target image to the original reference image to generate a reconstructed reference image (S430). A converter and generator perform the following additional steps to generate the reconstructed reference image. In order to generate a plurality of attribute values for a reference image reconstruction, the converter replaces at least one attribute value corresponding to the target attribute from among the attribute values of the original reference image $x^{ref}$ with at least one attribute value corresponding to the target attribute of the generated target image. The generator generates a reconstructed reference image $x^{attrs}$ based on the attribute values for the reference image reconstruction, which are provided from the converter.

Next, in order to update their parameters (weights for each hierarchy layer), the neural networks utilize a reconstruction loss that represents a difference between the reconstructed source image $x^{back}$ and the original source image $x^{src}$, a reconstruction loss that represents a difference between the reconstructed reference image $x^{attrs}$ and the original reference image $x^{ref}$, and a generative adversarial loss of the generated target image $x^{trans}$ (S440). To this end, a discriminator receives random inputs of the generated target image $x^{trans}$ and the source image $x^{src}$, and it scores the input images.

The following description empirically presents that the method provided by some embodiments well performed not only for visual attribute transfer but also for reconfigurable image translation. The present inventors have tested the performance of the provided method for the transfer of various visual attributes (object angle attributes, object identity attributes, face attributes, fashion attributes etc). In each task, a single model learns to translate all elements of the input image to desired values, and it translates between multiple source-target image domain pairs. When given a target image, the trained network provided by the present disclosure can transfer visual attributes to the input image. The provided method has been expanded to "multiplex" case where the multiple attributes are transferred simultaneously.

Figure 5:
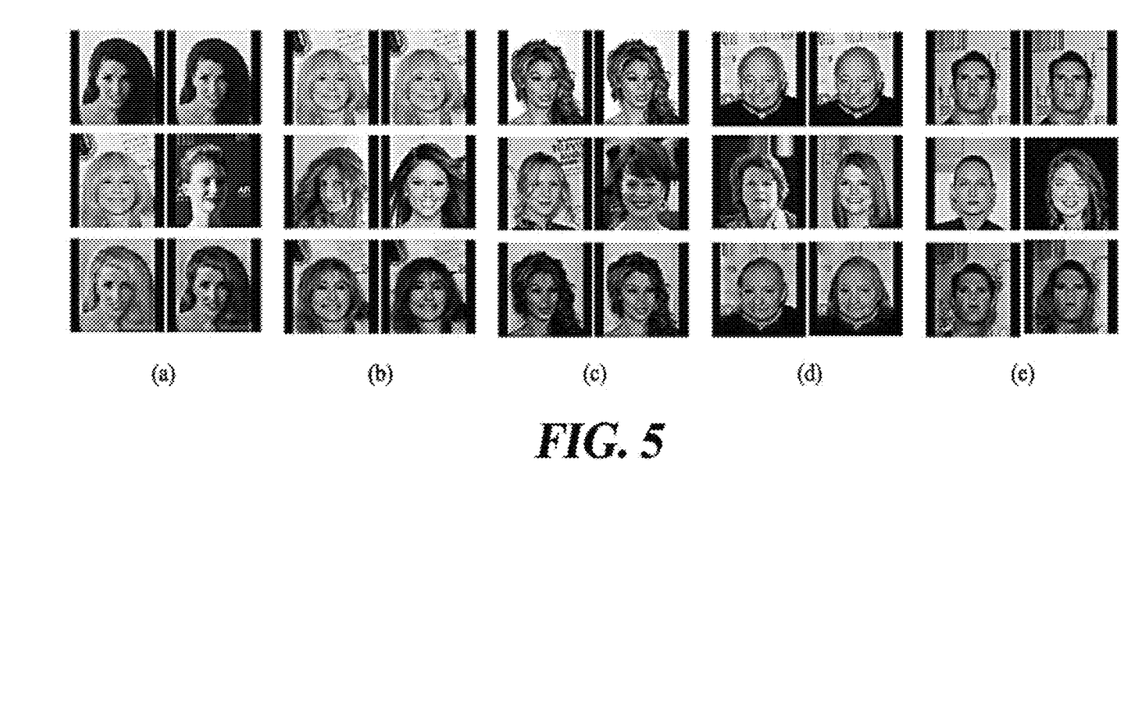
FIG. 5 shows experimental results concerning image attribute transfer.

FIG. 5 is a diagram showing experimental results relating to attribute transfer of images. In the image sets at (a) to (e), the first row shows source images, the second row shows reference images, and the third row shows generated target images. (a) image set shows the result of changing the hair color attribute from black to blond. In the second row, the target attribute value of the left image is a bright blond, and the target attribute value of the right image is a dark blond. The generated target images on the third row indicate that the target attributes are well transferred. (b) set shows the result of transferring blonde hair and brown hair. (c) set shows the result of transferring facial expression (with or without smile) attributes. (d) and (e) show the result of transferring hair length attributes.

Figure 6:
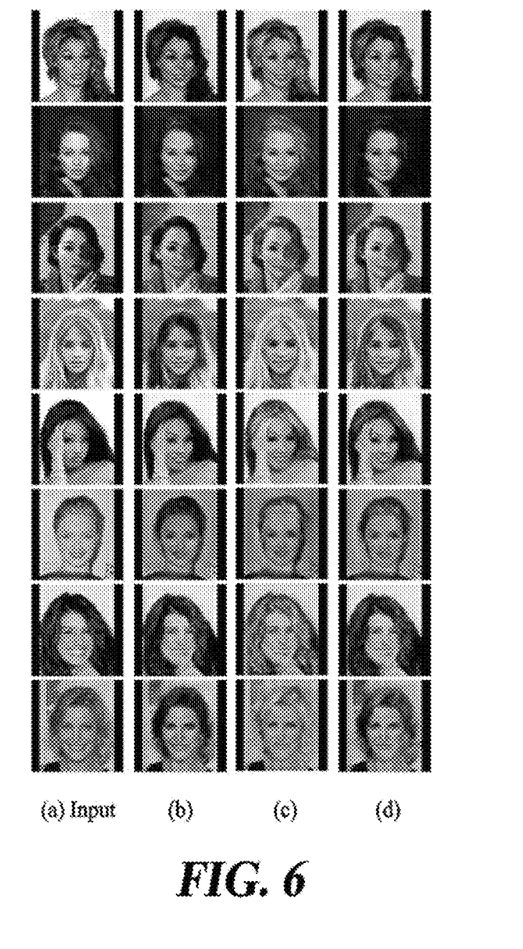
FIG. 6 shows the result of transferring multiplex face attributes.

FIG. 6 shows the results of multiplex face attribute transfer. The three rows from the bottom exhibit changes imparted to smiling females based on attributes of various hair colors of (b) black hair (c) blond hair (d) brown hair and an unsmiling female. The top five rows show the results of the experiment reversed to be based on a smiling female.

The present disclosure provides a framework for providing unsupervised visual attribute transfers via reconfigurable image translation. Such framework can also be applied to nonvisual attributes.

The provided framework has three distinctive features. i) Instead of changing an attribute of the source image by using a fixed mapping function like image-to-image translation, the presently disclosed model can transfer the instance-level attribute. ii) The disclosed model requires neither paired dataset, nor densely annotated attribute information. By only using domain-level labeled data, the disclosed model successfully transfers the details of a reference image to the source image. (iii) The disclosed model can be used to change multiple attributes of the source images by using a single model. Whereas, previously known image-to-image translation methods require models of all combinations of domain pairs.

Embodiments of the present disclosure and the functional operations described in this disclosure may be implemented in digital electronics including the architectures disclosed in this disclosure and its structural equivalents, tangibly-embodied computer software or firmware, computer hardware, or any one or more combinations thereof. Embodiments described in this disclosure are implemented as computer programs which are one or more modules of program instructions that are encoded on a tangible, non-transitory program for execution by a data processing apparatus or for controlling the operation of a data processing apparatus.

The processes and logic flows described in this disclosure can be performed by one or more programmable processors executing one or more computer programs for performing functions by operating input data and generated output. Further, the processes and logic flows are performed by dedicated logic circuits, for example, field programmable gate arrays (FPGAs) or application specific integrated circuits (ASICs), and the equivalent devices are also implemented by those dedicated logic circuits.

Similarly, although the operations are illustrated in a particular order in the drawing, this does not mean the operations need to be performed in the particular order illustrated, or in sequential order, or that all of the illustrated operational steps be necessarily performed, to achieve the desired results. In certain circumstances, multitasking and parallel processing are advantageous. Furthermore, in the described illustrative implementations, segregation of various system components should not be understood as all implementations require segregation, but rather the described program components and systems are generally to be understood that they may be integrated in a single software product or packaged into multiple software products that are installed in one or more types of media.

The above explanation is merely an explanation of the technical idea of the present disclosure, and any person having ordinary knowledge in the technical field to which the present disclosure belongs will understand that various modifications and modifications are possible within the scope of the essential characteristics of the illustrative embodiments. Therefore, the embodiments of the present disclosure are intended to illustrate rather than limit the technical concept of the present disclosure, and the scope of the technical idea of the present disclosure is not limited by such examples. The scope of the present disclosure should be interpreted by the following claims, and all technical ideas within the equivalent scope are to be interpreted as being included in the scope of the present disclosure.

What is claimed is:

1. A system for learning an attribute transfer that conveys at least one attribute value of a reference image to a source image, the system comprising:
   an encoder configured to encode an original source image to generate a plurality of attribute values that specify the original source image, and to encode an original reference image to generate a plurality of attribute values that specify the original reference image;
   a converter configured to replace at least one attribute value of a target attribute of the attribute values of the original source image with at least one corresponding attribute value of the original reference image, to obtain a plurality of attribute values that specify a target image of interest; and
   a generator configured to generate a target image based on the attribute values of the target image of interest,
   wherein during training the system,
      the encoder encodes the generated target image to generate a plurality of attribute values that specify the generated target image,
      the converter replaces at least one attribute value corresponding to the target attribute among the attribute values of the generated target image with at least one attribute value corresponding to the target attribute of the original source image, to generate a plurality of attribute values for a source image reconstruction,
      the generator generates a reconstructed source image based on the attribute values of the source image reconstruction,
      the converter replaces at least one attribute value corresponding to the target attribute among the attribute values of the original reference image with at least one attribute value corresponding to the target attribute of the target image, to generate a plurality of attribute values for a reference image reconstruction, and
      the generator generates a reconstructed reference image based on the attribute values for the reference image reconstruction,
   wherein, during training the system, parameters of the encoder and the generator are updated by using,
      a reconstruction loss that represents a difference between the reconstructed source image and the original source image,
      a reconstruction loss that represents a difference between the reconstructed reference image and the original reference image, and
      a generative adversarial loss of the generated target image.

2. The system of claim 1, further comprising a discriminator configured to learn a discrimination model for discriminating a generated target image from the original source image.

3. A computer-implemented method of training one or more artificial neural networks to learn a visual attribute transfer that conveys a target attribute of a reference image to a source image, for causing the artificial neural networks to perform the computer-implemented method comprising:
   encoding an original source image to generate a plurality of attribute values that specify the original source image, and encoding an original reference image to generate a plurality of attribute values that specify the original reference image;
   in order to generate a plurality of attribute values that specify a target image of interest, replacing at least one attribute value of a target attribute from among the attribute values of the original source image with at least one corresponding attribute value of the original reference image;
   generating a target image based on the attribute values of the target image of interest;
   encoding the generated target image to generate a plurality of attribute values that specify a generated target image;
   in order to generate a plurality of attribute values for a source image reconstruction, replacing at least one attribute value corresponding to the target attribute from among attribute values of the generated target image with at least one attribute value corresponding to the target attribute of the original source image;
   in order to generate a plurality of attribute values for a reference image reconstruction, replacing at least one attribute value corresponding to the target attribute from among the attribute values of the original reference image with at least one attribute value corresponding to the target attribute of the target image;
   generating a reconstructed source image based on the attribute values for the source image reconstruction;

generating a reconstructed reference image based on the attribute values for the reference image reconstruction; and updating parameters of the artificial neural networks by using:
- a reconstruction loss that represents a difference between the reconstructed source image and the original source image,
- a reconstruction loss that represents a difference between the reconstructed reference image and the original reference image, and
- a generative adversarial loss of the generated target image.

\* \* \* \* \*